Figure 1A:
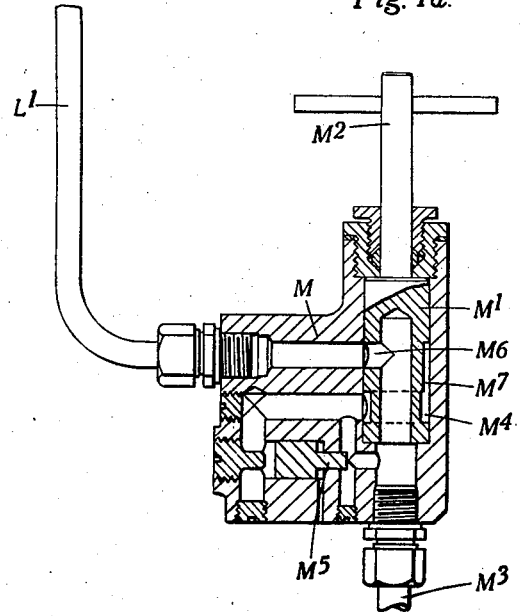

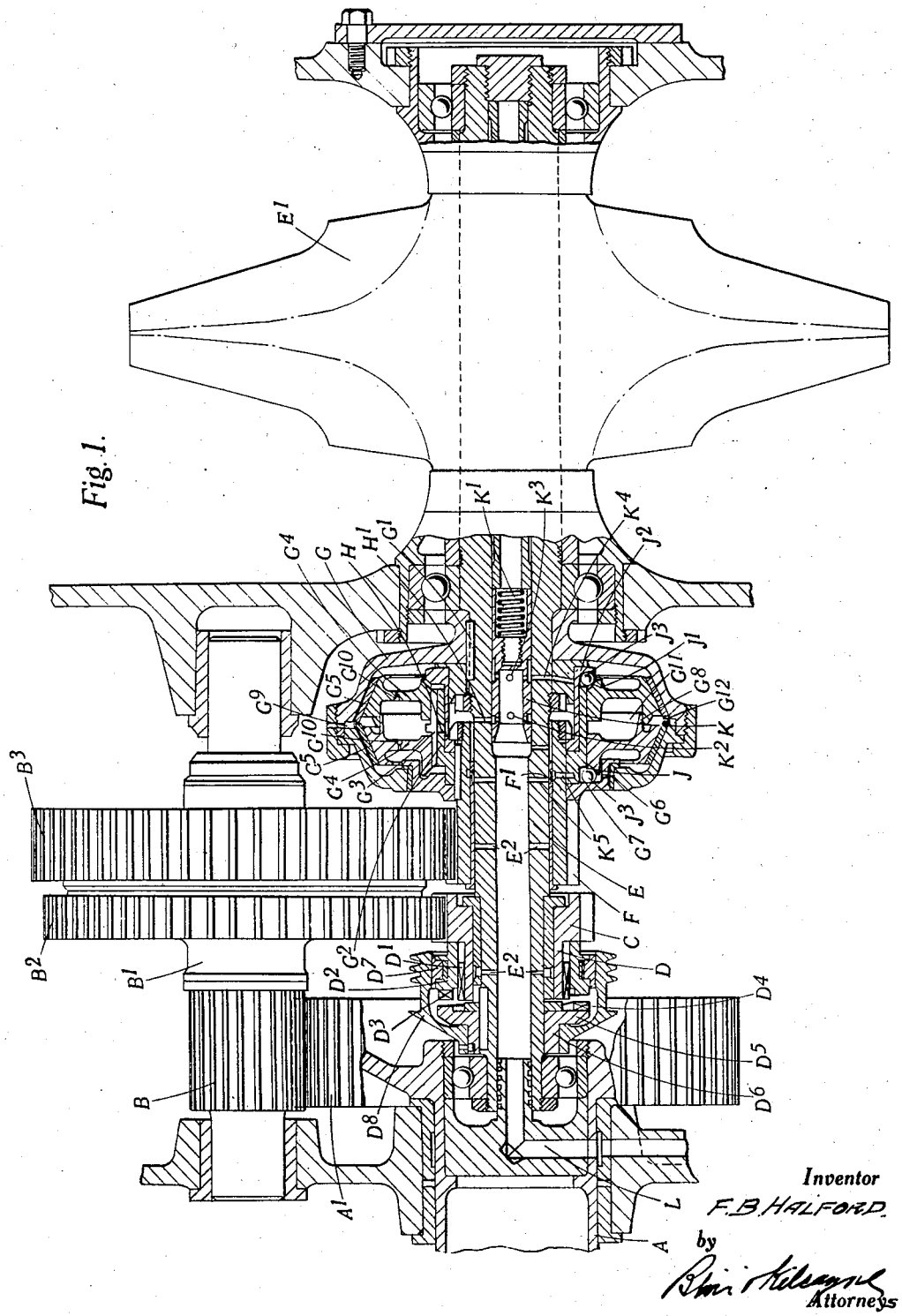

July 30, 1940.  F. B. HALFORD  2,209,884
FRICTION CLUTCH
Filed Oct. 3, 1938    3 Sheets-Sheet 2

Inventor
F. B. Halford
by
Blair & Kilsayne
Attorneys

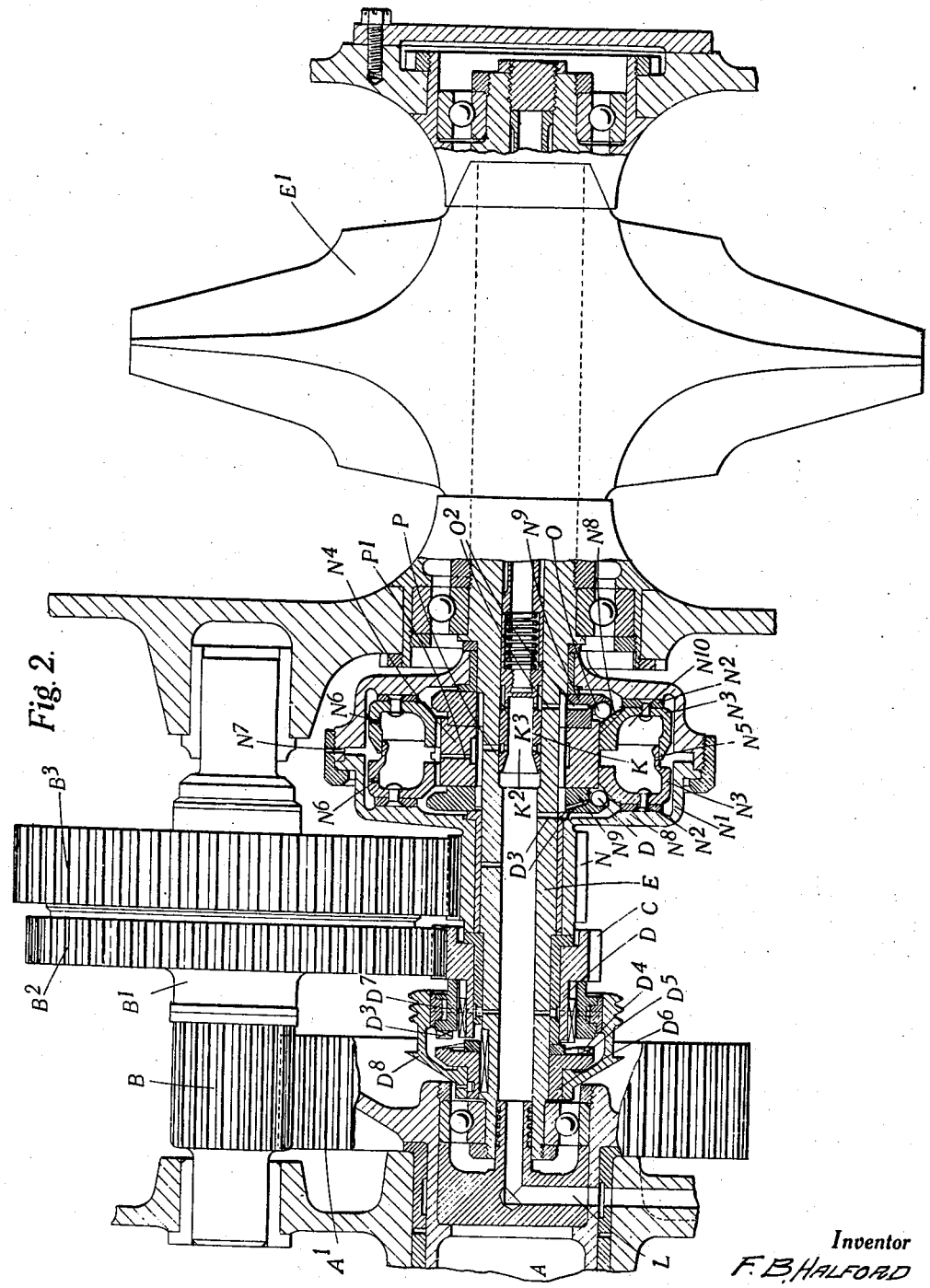

Patented July 30, 1940

2,209,884

UNITED STATES PATENT OFFICE 2,209,884

FRICTION CLUTCH

Frank Bernard Halford, Edgware, England, assignor to D. Napier & Son Limited, London, England, a company of Great Britain Application October 3, 1938, Serial No. 233,121
In Great Britain October 6, 1937

9 Claims. (Cl. 74—336)

This invention relates to friction clutches of the kind in which engagement of the friction members of the clutch is effected by relative axial movement between them and is maintained by liquid pressure created by centrifugal force in a liquid chamber rotating with the clutch members when engaged.

Such a clutch may be employed for example for coupling a supercharger or other driven member to an internal combustion engine through transmission mechanism or for bringing into and out of operation a ratio of variable-ratio transmission mechanism.

In a clutch of the kind referred to according to the present invention the driving or the driven member comprises two separate parts provided with friction surfaces and adapted to be moved axially in opposite directions into engagement with cooperating friction surfaces on the other member, and the liquid chamber is formed between the two parts. Thus, the axial forces exerted by the friction surfaces of the two parts constituting one member, on the other member, counterbalance one another.

Preferably one or more members, hereinafter called "disengaging members," are provided which, during operation, apply a disengaging force to the oppositely movable parts by reason of centrifugal force acting on such disengaging members. Thus, for example, the disengaging force may be applied to each of the oppositely movable parts by a series of balls or rollers each disposed in a slot which, viewed in planes containing the axis of rotation, tapers from a wider part nearer the axis of rotation to a narrower part more remote therefrom, one wall of each slot being constituted by a part which moves axially with the associated one of the oppositely movable parts while the other wall is held from axial movement relative to the casing.

When the two oppositely movable parts constitute the driven member of the clutch and this driven member does not normally rotate when the clutch is disengaged, means are provided for admitting the liquid to the liquid chamber between the two oppositely movable parts at a pressure sufficient to cause initial engagement when the driven member is stationary or rotating slowly. In such an arrangement where centrifugally operated members apply the disengaging force, it will be appreciated that when the driven member is stationary or rotating slowly, this disengaging force is absent or small so that the liquid pressure need not be high.

The invention may be applied, for example, to a clutch forming part of multiple-ratio transmission gearing. Thus, in the case of two-ratio gearing, the gearing may comprise driving and driven main shafts and an intermediate layshaft carrying gear wheels one of which meshes with a gear wheel connected directly to one of the main shafts, hereinafter termed "the driving shaft," another with a gear wheel connected to the other or driven main shaft through a unidirectional driving device and a third with a gear wheel adapted to be connected to the driven main shaft through a clutch according to the invention. In such an arrangement the ratios of the gearing for connecting the layshaft to the driven shaft respectively through the unidirectional driving device and the clutch is such that with the clutch engaged the driven part of the unidirectional driving device overruns the driving part thereof whereas when the clutch is disengaged the unidirectional driving device takes up the transmission of power through its associated gearing.

Two alternative constructions according to the invention are illustrated by way of example in the accompanying drawings, in which—

Figure 2A:
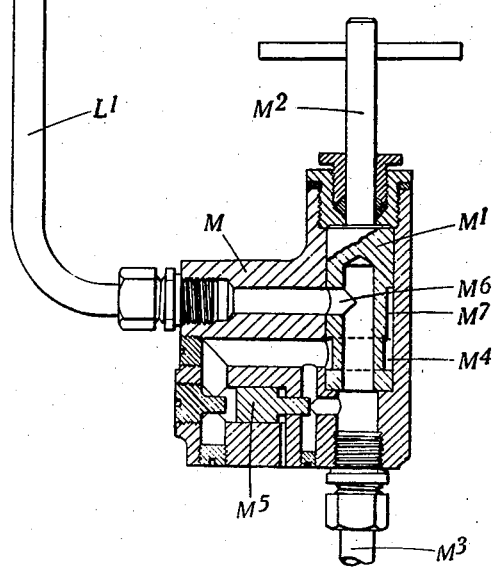

Figure 1 is a sectional side elevation, partly somewhat diagrammatic, of one construction according to the invention as incorporated in two-ratio transmission mechanism for driving the rotor of a supercharger from an internal combustion engine, and Figure 2 is a similar view to Figure 1 of an alternative construction according to the invention.

In the construction illustrated in Figure 1, the apparatus comprises a driving shaft A connected to the internal combustion engine and carrying a gear wheel $A^1$ which meshes with a gear wheel B on a layshaft $B^1$ carrying two gear wheels $B^2$, $B^3$ of different diameters.

The gear wheel $B^2$ meshes with a gear wheel C constituting the driving member of a unidirectional driving device. This unidirectional driving device comprises a driving member D in the form of a hollow boss connected to the gear wheel C and having on its outer surface helical splines $D^1$ by which it is connected to an intermediate sleeve member $D^2$ having ratchet teeth $D^3$ on its end face adapted to engage with ratchet teeth $D^4$ on a disc $D^5$ carried on a boss $D^6$ secured to a driven shaft E on which is mounted the impeller $E^1$ of the supercharger. The intermediate member $D^2$ carries friction slippers $D^7$ frictionally engaging the inner surface of a drum $D^8$ secured to the boss $D^6$ so that when relative rotation in one direction takes place between the gear wheel C and the shaft E and hence between the intermediate member $D^2$ and the drum $D^8$, the slippers $D^7$, by exerting a frictional drag, cause rotational movement of the member $D^2$ on the boss D which, through the helical splines $D^1$, is translated into longitudinal movement of the member $D^2$ to the right to cause disengagement of the ratchet teeth $D^3$, $D^4$ whereas when relative rotation between the gear wheel C and the shaft E takes place in the opposite direction, the opposite effect is produced to bring the ratchet teeth $D^3$, $D^4$ into positive driving engagement so that power is transmitted from the gear wheel C directly to the shaft E.

The gear wheel $B^3$ meshes with a gear wheel F freely supported on bearings on the driven shaft E and formed integral with a short hollow shaft $F^1$ which is adapted to be connected to the driven shaft E through a clutch according to the invention. Thus, the short hollow shaft $F^1$ extends into a clutch casing G rigidly secured as by a key $G^1$ to the driven shaft E and thus constituting the driven member of the clutch. Secured to the end of the shaft $F^1$ which extends into the casing G is a sleeve $G^2$ the outer surface of which is provided with splines $G^3$ which engage corresponding splines on the inner circumferential surface of two oppositely movable driving clutch members $G^4$ having oppositely coned friction surfaces $G^5$ adapted to engage corresponding friction surfaces on the circumferential wall of the casing G through floating friction linings. The end of the casing G remote from that secured to the shaft E by the key $G^1$ is supported on a bearing $G^6$ on a member $G^7$ rigidly secured to the shaft $F^1$.

The two clutch members $G^4$ are provided with parts, indicated at $G^8$, which can slide relatively to one another and have a slight clearance between them for the purpose hereinafter described, while the casing G is provided with drain holes $G^9$. Leak passages $G^{10}$ are also provided in the walls of the members $G^4$ for the purpose hereinafter described.

Passages H, $H^1$ are provided whereby oil can be supplied from the interior of the shaft E to the liquid chamber $G^{11}$ between the clutch members $G^4$ at a rate such that in spite of the continuous escape of this oil from the chamber $G^{11}$ through the passages $G^{10}$ and between the parts $G^8$, this chamber will be substantially filled with oil in which pressure will therefore during rotation be caused by centrifugal force such as to force the members $G^4$ apart and thus cause engagement of the friction surfaces $G^5$.

Formed on opposite ends of the members $G^4$ are inclined surfaces J, $J^1$ which, with surfaces respectively on the member $G^7$ and on a flange $J^2$, form tapering slots in which lie balls $J^3$ constituting disengaging members. The balls $J^3$ will thus be subject to centrifugal force during rotation and will exert on the members $G^4$ a force tending to move them towards one another and thus to cause disengagement of the friction surface $G^5$.

It will be seen that when liquid is not being supplied from the interior of the shaft E through the passages $H^1$, $H^2$ to the chamber $G^{11}$, this chamber will empty through the passages $G^{10}$ and the space between the parts $G^8$ and the action of the balls $J^3$ will then be to maintain the clutch disengaged, whereas when liquid is again supplied to the chamber $G^{11}$ so as substantially to fill it in spite of the continuous small escape through the passages $G^{10}$ and the space between the parts $G^8$, the pressure created in the liquid by centrifugal force will overcome the force exerted on the members $G^4$ by the balls $J^3$ and will thus move the members $G^4$ apart to cause engagement of the clutch.

Small grooves, as indicated at $G^{12}$, are conveniently provided at intervals in the parts of the members $G^4$ which abut against one another when the clutch is disengaged in order to allow for the escape of any oil which might otherwise tend to remain or collect in the chamber $G^{11}$ or the annular chamber surrounding the parts $G^8$.

Grooves are also conveniently provided in the friction surfaces to permit escape of oil between them even when engaged.

In the arrangement shown the supply of liquid to the chamber $G^{11}$ is controlled by a sleeve valve K capable of sliding axially within the shaft E and normally pressed to the left by a compression spring $K^1$, this valve having, in addition to ports $K^2$ which, when the valve is moved to the right, communicate with the ports $H^1$, ports $K^3$ which communicate at all times with ports $K^4$ for supplying lubricating oil to the righthand set of balls $J^3$ and the inner bearing surface of the part $J^2$. The lefthand set of balls $J^3$ is similarly supplied at all times with lubricating oil through passages $K^5$.

Means are provided for supplying oil to the interior of the shaft E at two different pressures, one pressure being sufficient to cause movement of the valve K to the right into the position shown so as to supply oil to the chamber $G^{11}$, while the other pressure is such that the valve K moves to the left under the action of its spring $K^1$ so that oil is only supplied through the ports $K^3$, $K^5$.

To this end, the interior of the shaft E communicates through a passage L with a pipe $L^1$ leading to a valve casing M in which is disposed a rotary valve $M^1$ controlled, for example, by a handle $M^2$. The rotary valve $M^1$ is of cylindrical form, its interior being directly open at all times to a high pressure oil supply pipe $M^3$ while an annular groove $M^4$ therein communicates at all times with the oil supply pipe $M^3$ through a pressure-reducing valve $M^5$ which serves to reduce the pressure from, say, the higher pressure of 50 pounds per square inch to an appreciably lower pressure such as 10 pounds per square inch. The pressure reducing valve $M^5$ is only diagrammatically illustrated since in itself it forms no part of the invention, being of the known type wherein the valve is in the form of a differential piston, the larger face of which is subject to the lower pressure while the smaller face is subject to the higher pressure. Formed in the valve $M^1$ is a port $M^6$ communicating with its interior and a longitudinal groove $M^7$ communicating at all times with the annular recess $M^4$. Thus, in one position of the valve the port $M^6$ communicates with the pipe $L^1$ so that oil at high pressure is supplied to this pipe while in the other position the groove $M^7$ communicates with the pipe $L^1$ so that oil at low pressure is supplied to the pipe $L^1$.

With the construction shown it will be seen that on the one hand, with the clutch disengaged, power will be transmitted from the shaft A through the gearing $A^1$, B, $B^2$, C and the unidirectional driving device to the shaft E, whereas on the other hand, when the clutch is engaged, power will be transmitted at a higher gear ratio from the shaft A through the gearing $A^1$, B, $B^3$, F and the clutch to the driven shaft E, the driven member of the unidirectional driving device then overrunning the driving member thereof.

Suitable passages conveniently lead from the interior of the shaft E to the various bearings surrounding this shaft, as indicated at $E^2$.

In the alternative construction illustrated in Figure 2, the apparatus comprises a driving shaft A carrying a gear wheel $A^1$ meshing with a gear wheel B on a layshaft $B^1$ carrying gear wheels $B^2$, $B^3$, as in the construction shown in Figure 1. Moreover, the gear wheel $B^2$ meshes with a gear wheel C connected through a unidirectional driving device to a driven shaft E, as in the construction shown in Figure 1.

In the construction shown in Figure 2, however, the gear wheel $B^3$ meshes with a gear wheel N rigidly secured to the casing $N^1$ of a clutch, whereby the gear wheel N can be connected to the driven shaft E. Thus, in this construction, the casing $N^1$ of the clutch is provided on its end walls with friction surfaces $N^2$ adapted to be engaged by corresponding friction surfaces on two oppositely movable driven clutch members $N^3$ mounted to slide on splines on a member $N^4$ which is rigidly secured to the driven shaft E. The two members $N^3$ have overlapping parts, as indicated at $N^5$, which can, however, slide relatively to one another and have a small clearance between them, a lip or rim being formed on the inner part to cause reduction of this clearance and thus reduce the clearance at high speeds. In addition, the members $N^3$ are provided with restricted drain passages $N^6$ and the casing is provided with drain passages $N^7$.

The two members $N^3$ are also provided with inclined surfaces $N^8$ which, with surfaces on members $N^9$ secured to the shaft E, form tapering slots in which lie balls O which constitute disengaging members which, during rotation, thus exert a force on the members $N^3$ tending to move them towards one another to cause disengagement of the clutch.

As in the construction shown in Figure 1, means are provided for supplying oil to the liquid chamber $N^{10}$ between the members $N^3$ through passages P, $P^1$, this supply being controlled by a valve K constructed and arranged in the same manner as the valve K in the construction shown in Figure 1. Thus, in this construction also, in addition to the ports $K^2$ in the valve through which high pressure liquid will flow to the chamber $N^{10}$ when liquid is delivered at high pressure to the interior of the shaft E, ports $K^3$ are provided through which oil can flow at all times through passages $O^2$ to the righthand set of balls, passages $O^3$ being provided for the supply of oil to the lefthand set of balls.

The means for supplying oil respectively at higher and lower pressure to the interior of the shaft E and for controlling this supply are the same as in the construction shown in Figure 1.

It will be seen that in the construction shown in Figure 2 when the clutch is disengaged, power will be transmitted at the lower gear ratio from the shaft A through the gear wheels $A^1$, B, $B^2$, C and the unidirectional driving device to the shaft E, whereas when the clutch is engaged, power will be transmitted at the higher ratio from the shaft A through the gear wheels $A^1$, B, $B^3$, N and the clutch to the shaft F the driven member of the unidirectional driving device then overrunning the driving member.

Further, in the construction shown in Figure 1, the supply of oil through the passages $K^3$, $K^4$, $K^5$ will not only lubricate the balls $J^3$ but will also supply lubricant to the friction surfaces during the action of engagement, while similarly in the construction shown in Figure 2, the supply of oil through the passages $O^2$ and $O^3$ will lubricate the balls and supply lubricant to the friction surfaces during engagement.

The general operation of the clutch shown in Figure 2 is the same as that shown in Figure 1, except that since in Figure 2 the members $N^3$ between which the liquid chamber is formed rotate with the driven shaft, whereas in the construction shown in Figure 1 the corresponding members $G^4$ rotate with the gear wheel F, the speed of engagement of the clutch may be different.

It is to be understood that the control of the valve $M^2$ in either of the constructions shown may be effected either manually or automatically, for example in accordance with the altitude, engine speed or power, say by apparatus such as that described in the specification of United States of America patent application Serial No. 109,168.

It will be seen that the arrangement according to the invention provides for the balance of axial thrusts due to liquid pressure in the clutch.

Further, in the transmission mechanism shown, the clutch operates at high speed and with small torque so that it can be light and small.

What I claim as my invention and desire to secure by Letters Patent is:

1. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, the driving and driven parts of the clutch being axially movable relatively to one another to bring friction surfaces into and out of engagement, a liquid chamber a part at least of one wall of which is constituted by a part of one of the clutch parts so that liquid pressure created in the chamber by centrifugal force will cause axial movement of such clutch part into engagement with the other clutch part, a passage through which liquid can be supplied to the chamber substantially to fill it and means for controlling the supply of liquid to the chamber, the ratio of the multiplying gearing connecting the layshaft to the driving part of the unidirectional driving device being lower than that of the multiplying gearing connecting the layshaft to the driving part of the clutch.

2. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, cooperating friction surfaces carried by the driving and driven parts of the clutch one of such parts comprising two separate members which carry friction surfaces and are movable axially in opposite directions to bring these friction surfaces into engagement with friction surfaces on the other part, a liquid chamber the end walls of which are constituted by parts of the said two oppositely movable members, a passage through which liquid can be supplied to the chamber substantially to fill it, and means for controlling the supply of liquid to the chamber, the ratio of the multiplying gearing connecting the layshaft to the driving part of the unidirectional driving device being lower than that of the multiplying gearing connecting the layshaft to the driving part of the clutch.

3. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, cooperating friction surfaces carried by the driving and driven parts of the clutch one of such parts comprising two separate members which carry friction surfaces and are movable axially in opposite directions to bring these friction surfaces into engagement with friction surfaces on the other part, a liquid chamber the end walls of which are constituted by parts of the said two oppositely movable members, a passage through which liquid can be supplied to the chamber substantially to fill it, means for controlling the supply of liquid to the chamber, a series of disengaging members associated with each of said oppositely movable members and each disposed in a slot which viewed in cross-sections containing the axis of rotation, tapers from a wider part nearer the axis to a narrower part more remote therefrom, one wall of each slot moving axially with the associated one of the oppositely movable members while the other wall is held from axial movement relatively to the part of the clutch with which the said oppositely movable members cooperate, the ratio of the multiplying gearing connecting the layshaft to the driving part of the unidirectional driving device being lower than that of the multiplying gearing connecting the layshaft to the driving part of the clutch.

4. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, the driving and driven parts of the clutch being axially movable relatively to one another to bring friction surfaces into and out of engagement, a liquid chamber a part of one wall of which is constituted by a part of one of the clutch parts so that liquid pressure created in the chamber by centrifugal force will cause axial movement of such clutch part into engagement with the other clutch part, a passage through which liquid can be supplied to the chamber substantial to fill it, means for controlling the supply of liquid to the chamber, and means for supplying oil to the friction surfaces during the period when engagement is being initiated, the ratio of the multiplying gearing connecting the layshaft to the driving part of the unidirectional driving device being lower than that of the multiplying gearing connecting the layshaft to the driving part of the clutch.

5. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, cooperating friction surfaces carried by the driving and driven parts of the clutch one of such parts comprising two separate members which carry friction surfaces and are movable axially in opposite directions to bring these friction surfaces into engagement with the friction surfaces on the other part, a liquid chamber the end walls of which are constituted by parts of the said two oppositely movable members, a passage through which liquid can be supplied to the chamber substantially to fill it, means for controlling the supply of liquid to the chamber, a series of disengaging members associated with each of the said oppositely movable members and each disposed in a slot which viewed in cross-sections containing the axis of rotation, tapers from a wider part nearer the axis to a narrower part more therefrom, one wall of each slot moving axially with the associated one of the said oppositely movable members while the other wall is held from axial movement relatively to the part of the clutch with which the oppositely movable members cooperate, means for supplying lubricating oil to the slots containing the disengaging members and means whereby such lubricating oil can flow by centrifugal force from the disengaging members to the said friction surfaces during the period when engagement is being initiated, the ratio of the multiplying gearing connecting the layshaft to the driving part of the unidirectional driving device being lower than that of the multiplying gearing connecting the layshaft to the driving part of the clutch.

6. A two ratio transmission gear more particularly for driving a super-charger of an internal combustion engine comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, cooperating friction surfaces carried by the driving and driven parts of the clutch one of such parts comprising two separate members which carry friction surfaces and are movable axially in opposite directions to bring these friction surfaces into engagement with the friction surfaces on the other part, a liquid chamber the end walls of which are constituted by parts of the said two oppositely movable members, a passage through which liquid can be supplied to the chamber substantially to fill it, a valve for controlling the supply of liquid from the passage to the chamber, means for delivering oil to the passage selectively at a higher and lower pressure and means whereby the valve is caused to move automatically so that when oil is supplied at the higher pressure the valve moves to permit the supply of oil to the liquid chamber whereas when the oil is supplied at the lower pressure the valve moves to cut off the supply of oil to the liquid chamber but to maintain the supply of oil for lubricating purposes to the parts of the clutch, the ratio of the multiplying gearing connecting the layshaft to the driving part of the unidirectional driving device being lower than that of the multiplying gearing connecting the layshaft to the driving part of the clutch.

7. A two ratio transmission gear more particularly for driving a super-charger of an internal combustion engine comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, cooperating friction surfaces carried by the driving and driven parts of the clutch one of such parts comprising two separate members which carry friction surfaces and are movable axially in opposite directions to bring these friction surfaces into engagement with friction surfaces on the other part, a liquid chamber the end walls of which are constituted by parts of the said two oppositely movable members, a passage through which liquid can be supplied to the chamber substantially to fill it, means for controlling the supply of liquid from the passage to the chamber, comprising a valve of the piston type, means for supplying high and low pressure oil respectively to the parts of the passage lying on opposite sides of the valve, a viscous resistance element provided in the passage, serving to control the rate of flow of liquid through the clutch in accordance with the viscosity of such liquid, the ratio of the multiplying gearing connecting the layshaft to the driving part of the unidirectional driving device being lower than that of the multiplying gearing connecting the layshaft to the driving part of the clutch.

8. A two ratio transmission gear more particularly for driving a super-charger of an internal combustion engine, comprising driving and driven main shafts, an intermediate shaft constituting a layshaft, intermeshing gear wheels constituting multiplying gearing connected respectively to the driving shaft and the layshaft, a unidirectional driving device coaxial with the driven shaft with its driven part connected to such driven shaft, intermeshing gear wheels constituting multiplying gearing and connected respectively to the layshaft and to the driving part of the unidirectional driving device, a clutch coaxial with the driven shaft and having its driven part connected to such driven shaft, intermeshing gear wheels constituting multiplying gearing connected respectively to the layshaft and to the driving part of the clutch, the driving and driven parts of the clutch being axially movable relatively to one another to bring friction surfaces into and out of engagement, a liquid chamber a part at least of one wall of which is constituted by a part of one of the clutch parts so that liquid pressure created in the chamber by centrifugal force will cause axial movement of such clutch part into engagement with the other clutch part, means for permitting discharge of oil from the chamber at a comparatively low rate under the action of centrifugal force, a passage through which liquid can be supplied to the chamber substantially to fill it and means for controlling the supply of liquid to the chamber, the ratio of the multiplying gearing connecting the layshaft to the driving part of the unidirectional driving device being lower than that of the multiplying gearing connecting the layshaft to the driving part of the clutch.

9. A two ratio transmission gear as claimed in claim 6, in which the valve comprises a piston and a spring acting on the piston such that when oil is supplied at the higher pressure it permits movement of the valve to enable oil to pass to the liquid chamber whereas when oil is supplied at the lower pressure the valve moves to cut off the supply of oil to the chamber while permitting continuance of flow of oil for lubricating purposes.

FRANK BERNARD HALFORD.